US011266275B1

(12) United States Patent
Ghiorghie et al.

(10) Patent No.: US 11,266,275 B1
(45) Date of Patent: Mar. 8, 2022

(54) SHOWER CADDY GRIP HOOK AND ACCESSORY GRIP LOCK

(71) Applicant: InterDesign, Inc., Solon, OH (US)

(72) Inventors: Radu Alexandru Ghiorghie, Copley, OH (US); Sara Czukal McBride, Wickliffe, OH (US)

(73) Assignee: InterDesign, Inc., Solon, OH (US)

( * ) Notice: Subject to any disclaimer, the term of this patent is extended or adjusted under 35 U.S.C. 154(b) by 0 days.

(21) Appl. No.: 16/987,481

(22) Filed: Aug. 7, 2020

Related U.S. Application Data

(60) Provisional application No. 62/946,473, filed on Dec. 11, 2019, provisional application No. 62/884,723, filed on Aug. 9, 2019.

(51) Int. Cl.
*A47K 3/28* (2006.01)
*A47G 1/00* (2006.01)
*F16B 45/00* (2006.01)

(52) U.S. Cl.
CPC ............. *A47K 3/281* (2013.01); *A47G 1/00* (2013.01); *F16B 45/00* (2013.01)

(58) Field of Classification Search
CPC ........ A47K 3/281; A47K 10/10; A47K 10/08; A47G 1/00; F16B 45/00; F16B 2/22; F16B 2/25
USPC ...... 211/119.009, 119.011, 66; 248/65, 74.2, 248/74.3, 74.4, 74.5
See application file for complete search history.

(56) References Cited

U.S. PATENT DOCUMENTS

| | | | | |
|---|---|---|---|---|
| 1,544,335 | A | * 6/1925 | Morehouse | A44B 9/18 24/708 |
| 2,355,742 | A | * 8/1944 | Morehouse | F16L 3/2235 248/68.1 |
| 3,421,632 | A | * 1/1969 | Wood | A47B 81/005 211/70.8 |
| 3,512,227 | A | 5/1970 | Krawagna | |
| 3,789,996 | A | * 2/1974 | Stroh | A47K 1/09 211/119 |
| 4,240,604 | A | 12/1980 | Brach | |
| 4,405,161 | A | * 9/1983 | Young | E21B 33/03 285/80 |
| 4,450,605 | A | * 5/1984 | Schaty | F16L 3/13 24/129 R |
| 4,573,591 | A | * 3/1986 | Chap | A47K 3/281 211/113 |

(Continued)

FOREIGN PATENT DOCUMENTS

WO 8500132 A1 1/1985
WO 2005042212 A1 5/2005
(Continued)

*Primary Examiner* — Jennifer E. Novosad
(74) *Attorney, Agent, or Firm* — Calfee, Halter & Griswold LLP

(57) ABSTRACT

A mounting clamp for mounting an organizer or other structure to a pipe or pole. The mounting clamp comprises an outer shell that is formed with a semicircle opening and containing a flexible material that is attached to the outer shell at each end of the semicircular opening. The mounting clamp is pressed against the pipe or pole to cause the flexible material to stretch around the pipe or pole to secure the mounting clamp to the pipe or pole. The organizer or other structure being secured to the mounting clamp and thus the pipe or pole.

19 Claims, 16 Drawing Sheets

(56) References Cited

U.S. PATENT DOCUMENTS

| | | | | |
|---|---|---|---|---|
| 5,054,741 A * | 10/1991 | Ismert | F16L 3/04 | 248/74.5 |
| 5,255,401 A * | 10/1993 | Sambrookes | A47K 3/281 | 206/77.1 |
| D342,005 S * | 12/1993 | Forsberg | D8/72 | |
| 5,301,917 A * | 4/1994 | Dyer | F16L 3/23 | 248/68.1 |
| 5,316,245 A * | 5/1994 | Ruckwardt | F16B 21/084 | 248/68.1 |
| 5,446,948 A | 9/1995 | Genero et al. | | |
| 5,615,852 A * | 4/1997 | Heidorn | F16L 3/237 | 174/135 |
| 5,619,777 A | 4/1997 | Genero et al. | | |
| 5,678,284 A | 10/1997 | Genero et al. | | |
| 5,752,681 A * | 5/1998 | Janssen | F16L 3/04 | 248/65 |
| 5,957,503 A * | 9/1999 | Brown | F16L 23/003 | 285/13 |
| D417,390 S * | 12/1999 | Hofman | D8/395 | |
| 6,520,351 B1 * | 2/2003 | Zadro | A47K 3/281 | 211/106 |
| 6,688,238 B1 | 2/2004 | Alexiou | | |
| 6,688,679 B2 * | 2/2004 | Droulez | B60R 16/0215 | 180/90 |
| D496,549 S * | 9/2004 | Snell | A47K 3/281 | D6/525 |
| D498,102 S * | 11/2004 | Snell | A47K 3/281 | D6/525 |
| 6,932,312 B1 * | 8/2005 | Chen | B25B 5/06 | 211/60.1 |
| 7,201,351 B2 * | 4/2007 | Stigler | F16L 3/1008 | 24/16 PB |
| 7,770,742 B1 * | 8/2010 | Wagner | A47K 3/281 | 211/119.009 |
| 7,770,848 B2 * | 8/2010 | Johnson | F16L 55/035 | 248/65 |
| D636,657 S | 4/2011 | Quinlan et al. | | |
| D642,039 S | 7/2011 | Forsberg et al. | | |
| 8,235,332 B2 * | 8/2012 | Cesarino | F16L 3/1233 | 248/74.5 |
| 8,348,072 B2 | 1/2013 | Whitehall | | |
| 8,356,778 B2 * | 1/2013 | Birli | F16L 3/243 | 248/73 |
| 8,602,798 B2 * | 12/2013 | Downing | F16L 3/1091 | 439/100 |
| 8,769,781 B2 | 7/2014 | Carney | | |
| 8,870,132 B2 * | 10/2014 | Sampson | F16L 3/22 | 248/74.1 |
| D771,476 S | 11/2016 | Prince et al. | | |
| 9,693,660 B1 * | 7/2017 | Stelmarski | A47K 3/281 | |
| 9,883,742 B2 * | 2/2018 | Yang | A47K 3/281 | |
| 10,064,523 B2 * | 9/2018 | Engell | A47F 5/01 | |
| 10,125,919 B2 | 11/2018 | Forsberg | | |
| 10,463,199 B2 | 11/2019 | Coratolo et al. | | |
| 10,527,202 B2 * | 1/2020 | Kanie | F16L 3/13 | |
| 10,595,683 B1 * | 3/2020 | Stelmarski | A47K 3/281 | |
| 2004/0188577 A1 | 9/2004 | Gaderick | | |
| 2006/0000953 A1 * | 1/2006 | Ismert | F16L 3/13 | 248/74.5 |
| 2007/0045208 A1 * | 3/2007 | Quan | A47K 3/281 | 211/119 |
| 2008/0000859 A1 * | 1/2008 | Yang | A47K 5/04 | 211/90.02 |
| 2011/0226913 A1 * | 9/2011 | Feige | F16L 3/12 | 248/74.2 |
| 2012/0091088 A1 * | 4/2012 | Didehvar | A47B 45/00 | 211/113 |
| 2014/0124467 A1 * | 5/2014 | Kwok | A47K 3/281 | 211/113 |
| 2014/0131529 A1 * | 5/2014 | Feige | F16L 3/12 | 248/74.5 |
| 2015/0041600 A1 * | 2/2015 | Sampson | F16L 3/1211 | 248/68.1 |
| 2015/0300531 A1 * | 10/2015 | Schmidt | F16L 3/13 | 248/74.2 |
| 2015/0342419 A1 * | 12/2015 | Yatscoff | A47K 3/281 | 211/119.011 |
| 2016/0091118 A1 * | 3/2016 | Alexander | E03C 1/06 | 248/56 |
| 2018/0256766 A1 | 9/2018 | Gareiss et al. | | |

FOREIGN PATENT DOCUMENTS

| | | |
|---|---|---|
| WO | 2016060606 A1 | 4/2016 |
| WO | 20180169835 A1 | 9/2018 |

\* cited by examiner

SHOWER CADDY GRIP HOOK AND ACCESSORY GRIP LOCK

RELATED APPLICATIONS

This application claims priority to, and any other benefit of, U.S. Prov'l Pat. Appl'n Ser. No. 62/884,723, filed Aug. 9, 2019 and U.S. Prov'l Pat. Appl'n Ser. No. 62/946,473, filed Dec. 11, 2019, the entire disclosures of which are incorporated by reference as though recited herein in their entireties.

FIELD

The inventive concepts relate generally to devices for securing shower caddies to a shower pipe and securing accessories (bins, hooks, shelves, mirrors, trays, baskets (bins formed from wire or other mesh), etc.) to a vertical pole without tools.

BACKGROUND

Shower organizers are known in the art and are called various names, such as caddies and shower caddies. Some types of shower caddies are mounted to or otherwise suspended from an exposed shower pipe having a distal shower head. Exemplary devices to secure a shower caddy to a shower pipe are shown in U.S. Pat. Nos. 8,769,781 and 9,693,660, which are assigned to the Applicant of this case and which are incorporated by reference herein except where they expressly contradict the teachings herein.

Vertical pole organizers are also known and are called various names, such as tension rod caddies, tension pole caddies, tension shower caddies, tension pole shower caddies, and the like. One or more accessories (bins, hooks, shelves, mirrors, trays, baskets (bins formed from wire or other mesh), etc.) are typically secured to the pole. Exemplary devices used to secure an accessory to a vertical pole are shown in U.S. Pat. No. 9,693,660, which is assigned to the Applicant of this case and which is incorporated by reference herein except where they expressly contradict the teachings herein.

SUMMARY

The present application discloses attachment methods for bath and shower storage and organization systems. The shower caddy grip hook and grip lock (grip lock) provide a device for quickly securing a shower caddy or similar device to a pipe or pole. In some exemplary embodiments, the grip lock is pressed onto a pipe or pole found in a shower area and used to secure a caddy or similar basket or receptacle to the pipe so as to avoid have the basket or receptacle slide along or pull away from the pipe or pole.

In some exemplary embodiments, a shower caddy grip hook is put in a primed position and simply placed over a shower pipe and the caddy is gently pulled down, and the shower caddy grip hook responds by automatically snapping to a locked position, gripping the shower pipe and securing the shower caddy to the shower pipe.

In an exemplary embodiment, a grip lock is comprised of a first outer shell portion formed in a curved shape, the outer shell having an outer surface and an inner surface, the inner surface extending from a first leg to a second leg of the curved shape, the first outer shell portion having a recess formed on its inner surface where the recess extends from the first leg to the second leg, a flexible grip having an enlarged portion at the first end and the second end, the enlarged portion having a greater cross-sectional area than the cross-sectional area along a length of the grip located between the first and second ends and having a larger cross section than the cross section of the recess such that the enlarged portions extend outward from the inner surface of the first outer shell portion; the first end of the grip affixed to the first leg, the second end of the grip affixed to the second leg, the grip held in tension between along its length between the first leg and the second leg when installed, and the first outer shell portion having a shelf portion for supporting the storage system.

In another exemplary embodiment, a shower caddy comprises a top hook, the top hook including a grip lock with an elastic piece that can be moved out to accept a shower pipe and snaps back around the shower pipe to secure the caddy to the shower pipe.

In another exemplary embodiment, a shower caddy is secured to a shower pipe by configuring the shower caddy with a top hook including a grip lock with an elastic piece, moving out the elastic piece, locating the moved out elastic piece of the top hook over the shower pipe, and moving the top hook toward the shower pipe so the elastic piece snaps back around the shower pipe to secure the caddy to the shower pipe.

Another exemplary embodiment comprises a shelf, basket, tray, hook, mirror, or bin further comprising (e.g., integrally formed with or affixed to) a grip lock to secure the shelf, basket, tray, hook, mirror, or bin to a vertical pole, the grip lock including an elastic piece that can be moved out to accept the vertical pole and snaps back around the vertical pole to secure the shelf, basket, tray, hook, mirror, or bin to the vertical pole.

In another exemplary embodiment, a shelf, basket, tray, hook, mirror, or bin to a vertical pole, is secured to a vertical pole by providing a shelf, basket, tray, hook, mirror, or bin with (e.g., integrally formed with or affixed to) a grip lock having an elastic piece, moving out the elastic piece, locating the moved out elastic piece of proximate the vertical pole, and moving the shelf, basket, tray, hook, mirror, or bin toward the vertical pole so the elastic piece snaps back around the vertical pole to secure the caddy to the vertical pole.

The above and other aspects and advantages of the general inventive concepts will become more readily apparent from the following description and figures, illustrating by way of example, the principles of the general inventive concepts.

BRIEF DESCRIPTION OF THE DRAWINGS

These and other features of the general inventive concept will become better understood with regard to the following description and accompanying drawings in which.

DETAILED DESCRIPTION

This detailed description merely describes exemplary embodiments of the invention and is not intended to limit the scope of the invention in any way. Indeed, the contemplated invention is broader than the exemplary embodiments. The terms used in any future claims have their full ordinary meaning unless an express definition is provided herein.

As known to those skilled in the art, exemplary caddies, such as shower caddies, have one or a plurality of accessories (e.g., shelves, baskets, trays, hooks, mirrors, and/or bins) oriented below a hanger or attached to a vertical support pole. As known to those skilled in the art, in some exemplary shower caddies, the accessories are connected together and the hanger suspends the shower caddy from a shower pipe, as shown, e.g., in FIG. 1 of U.S. Pat. No. 8,769,781 and FIGS. 31 and 76-77 of U.S. Pat. No. 9,693,660. Other exemplary caddies, such as shower caddies and closet organizers, have one or more vertical poles, as shown, e.g., in FIGS. 32A-34G of U.S. Pat. No. 9,693,660. Virtually any prior art shower caddy with a shower pipe hook can be modified to take advantage of the teachings herein by adding the grip hook to the hanger as taught herein (or replacing the hanger with the grip hook hanger taught herein). Virtually any prior art accessory for a vertical pole (e.g., as shown in U.S. Pat. No. 9,693,660) can be modified to take advantage of the teachings herein by replacing the proximal (pole-connecting) portion of the accessory with a grip lock connected to (affixed to or integrally molded therewith) the accessory, subject to the weight holding capabilities of the specific grip lock being used.

Figure 1A:
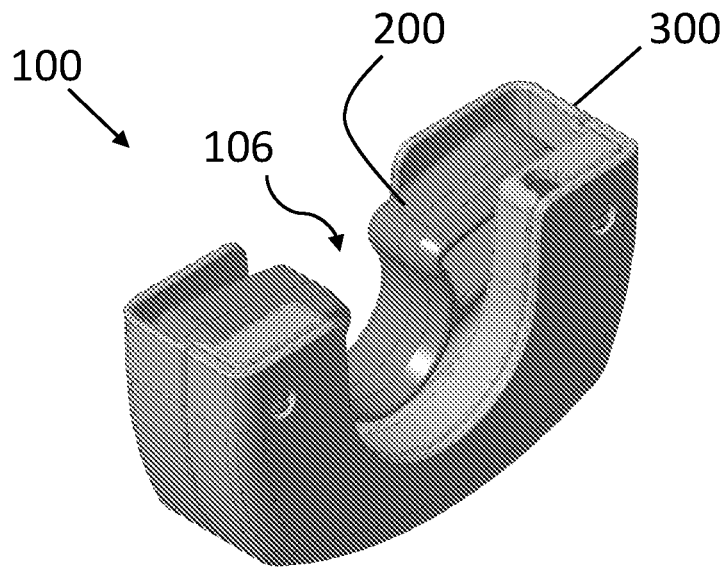
FIGS. 1a-1b illustrate a grip lock according to an exemplary embodiment.
Figures 5A, 5B:
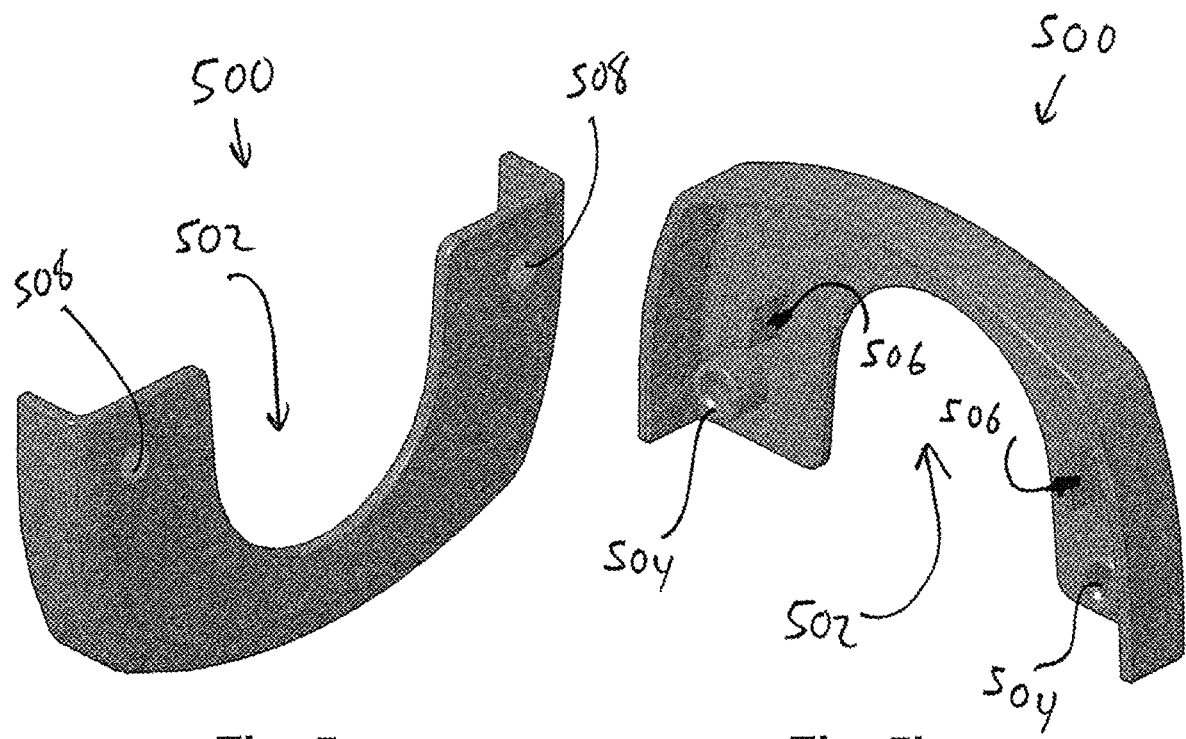
FIGS. 5a-5b illustrate a housing cover for a grip lock according to exemplary embodiment.
Figure 6:
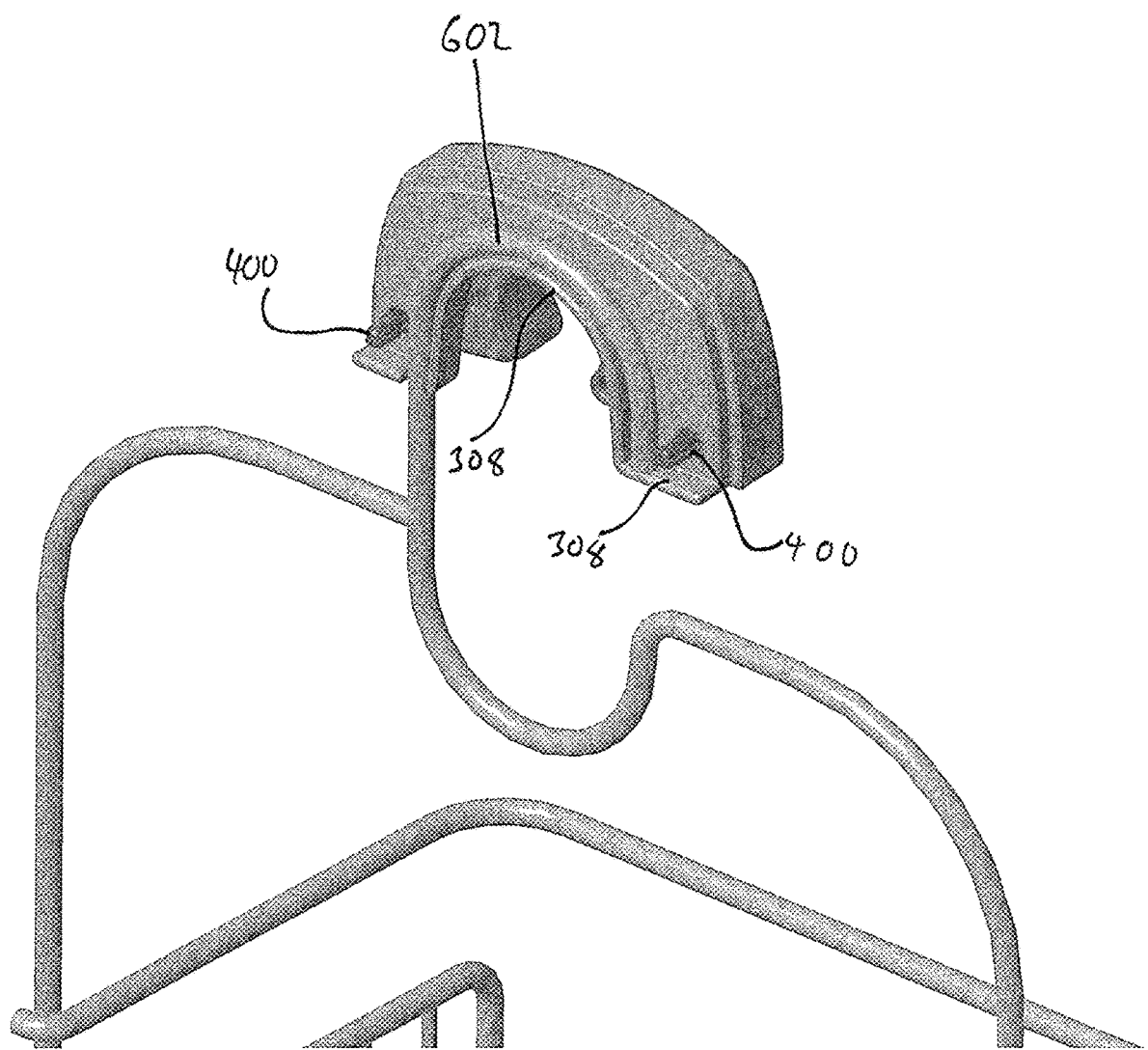
FIG. 6 illustrates a grip lock according to an exemplary embodiment affixed to a shelving system.
Figure 7A:
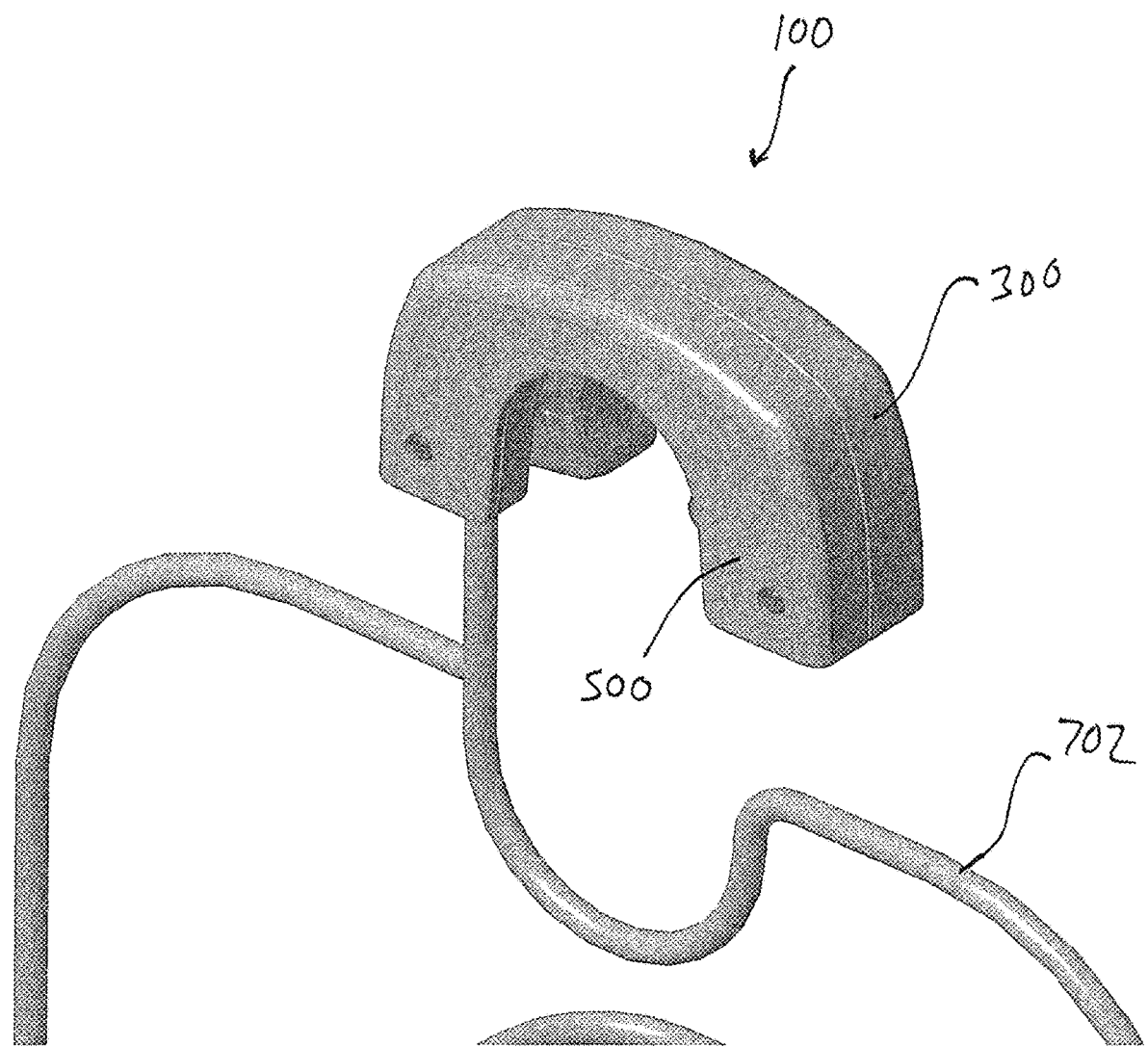
FIGS. 7a-7d illustrate the grip lock of FIG. 6 with a housing cover affixed to secure the shelving system to the grip lock.
Figure 7B:
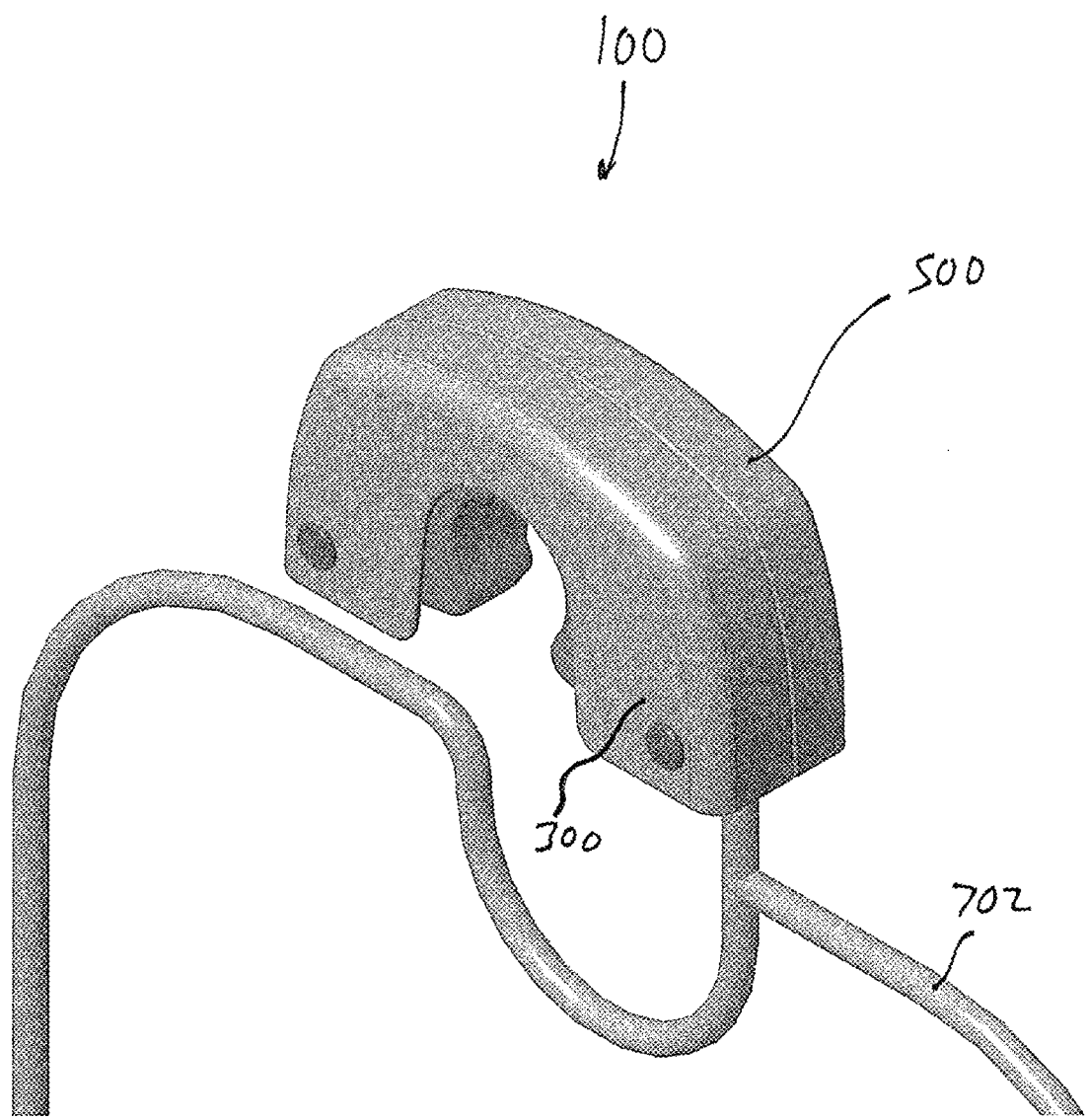
Figure 7C:
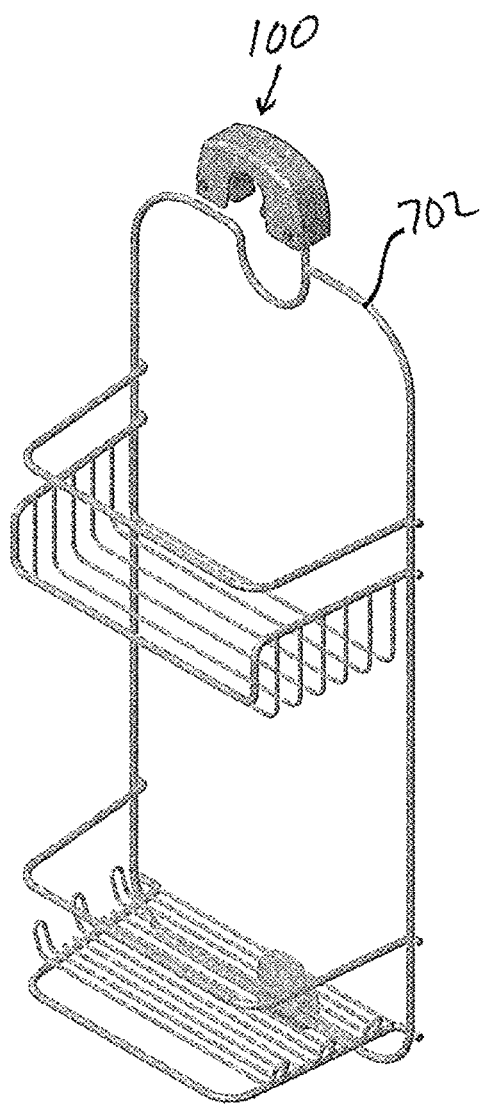
Figure 7D:
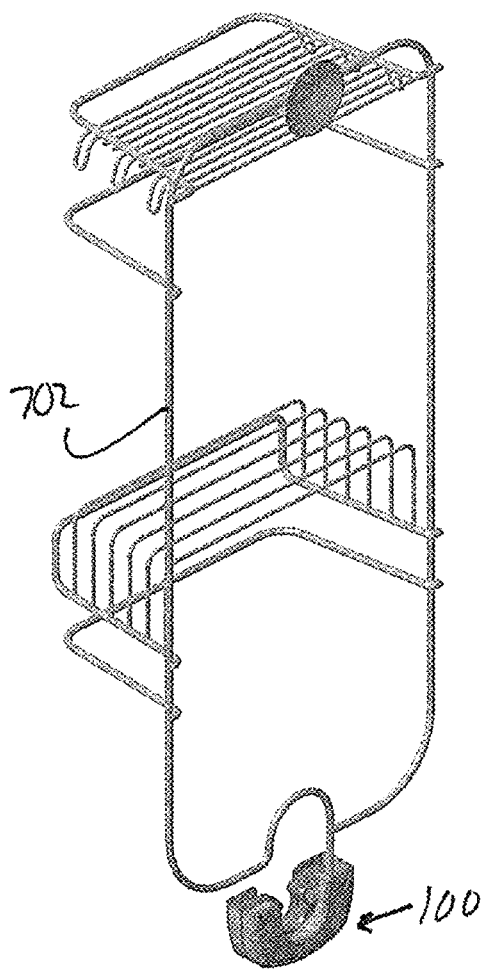
Figure 11:
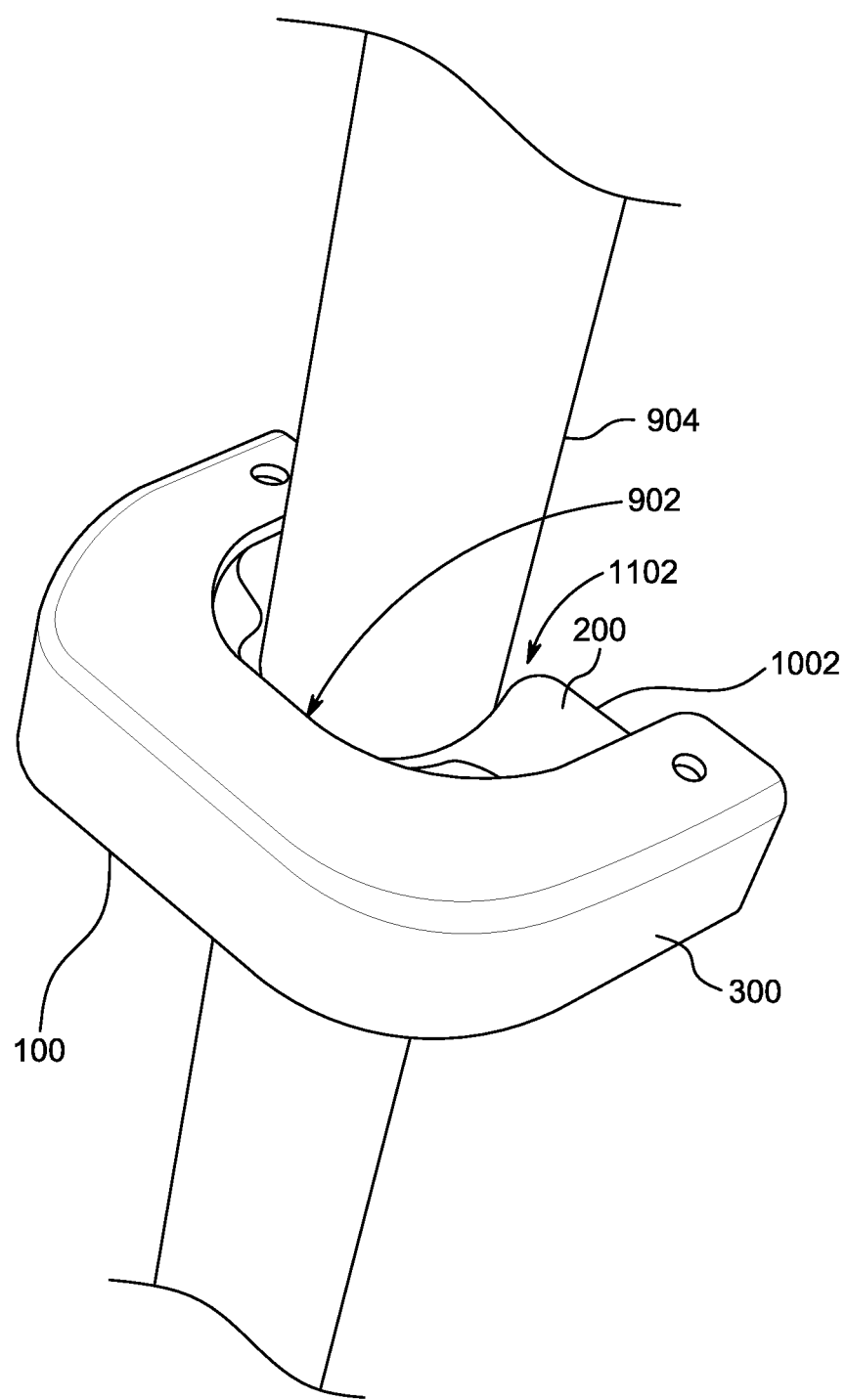
Figure 12:
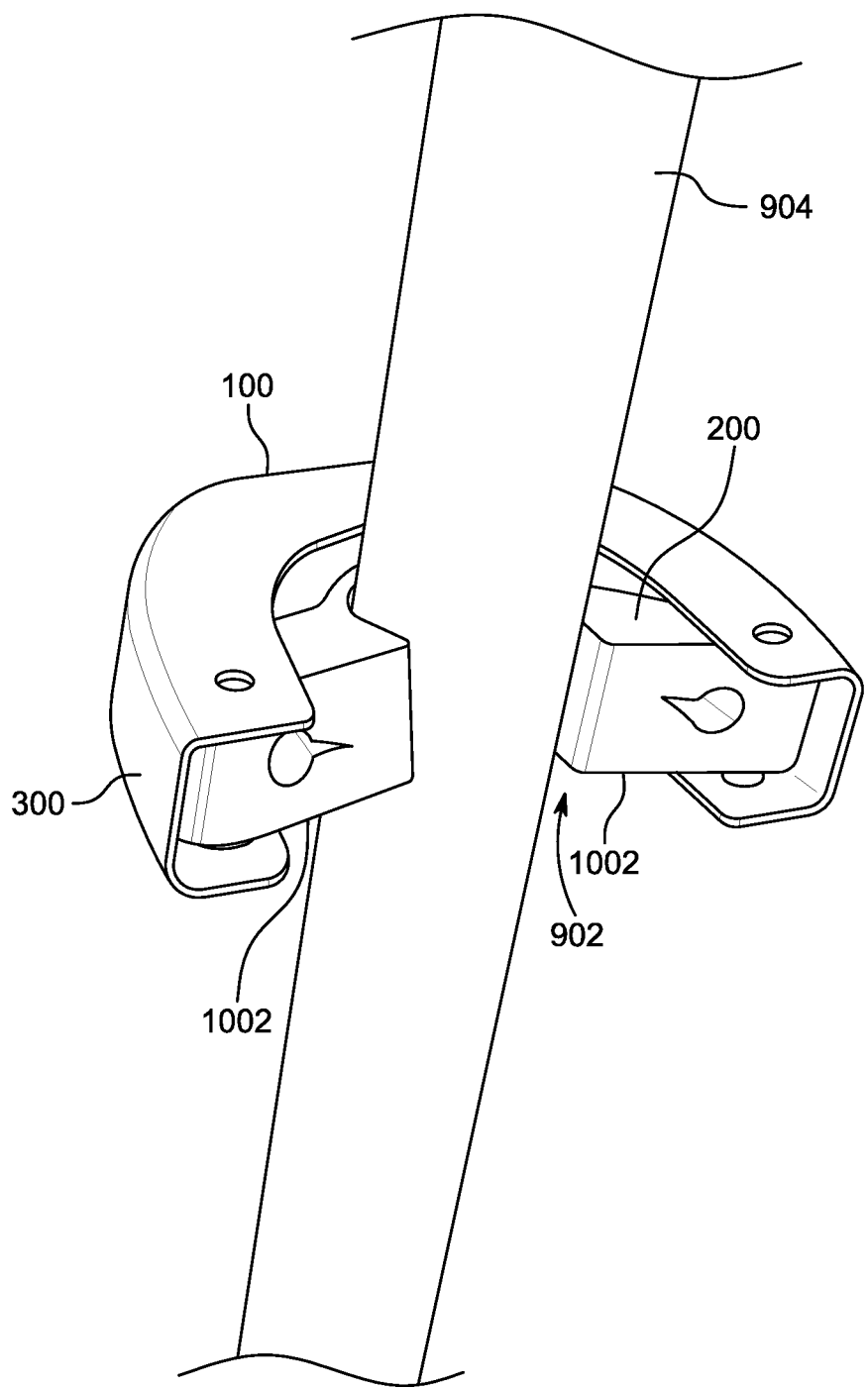
Figure 13:
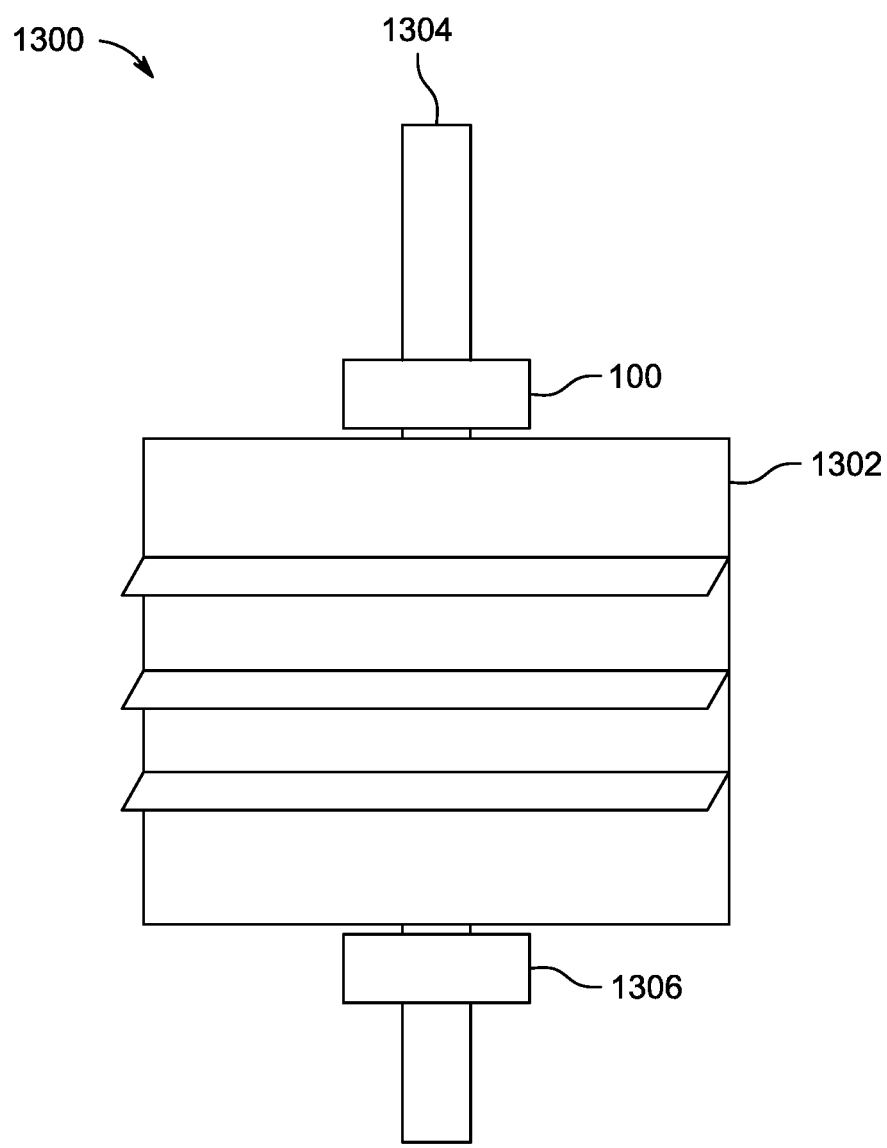
FIG. 13 is a schematic view of an exemplary shelf having (e.g., integrally formed with or affixed to) a grip lock to secure the shelf to a vertical pole.
Figure 14:
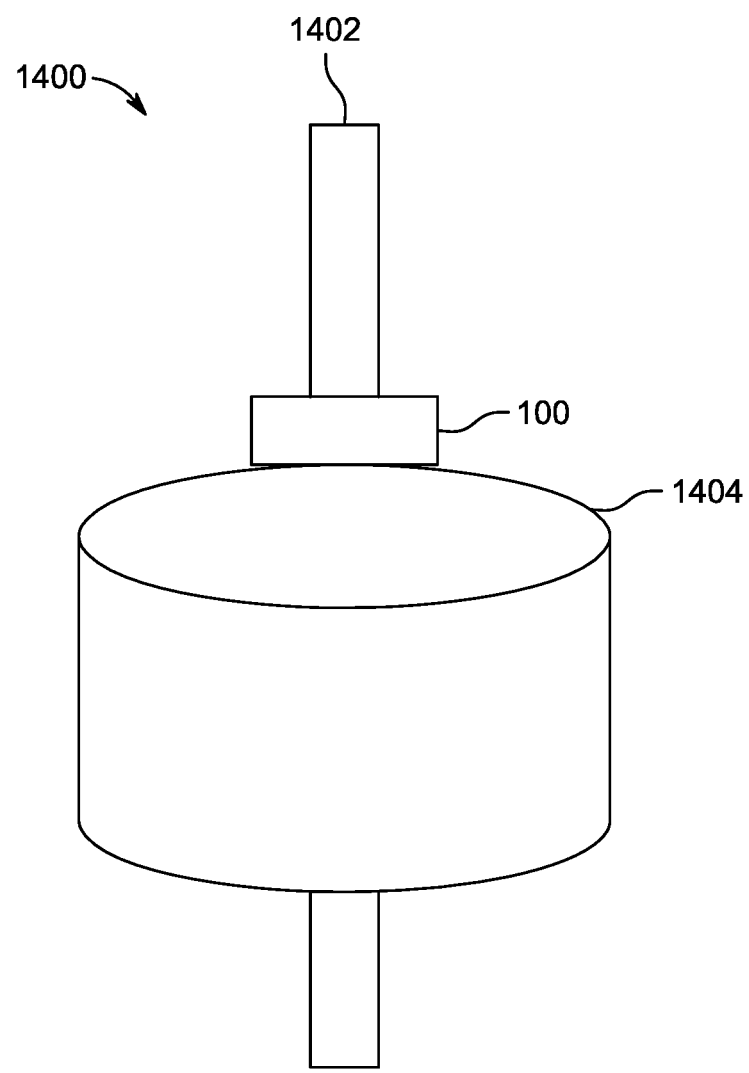
FIG. 14 is a schematic view of an exemplary bin having (e.g., integrally formed with or affixed to) a grip lock to secure the bin to a vertical pole.

Referring now to the drawings, FIGS. 1a-5b and 8-12 show exemplary grip locks that can secure, e.g., a shower caddy to a shower pipe and secure an accessory (e.g., a shelf, basket, tray, hook, mirror, or bin) to a vertical support pole. FIGS. 6-7d show an exemplary shower caddy with a grip lock. FIGS. 13-14 show exemplary vertical pole accessories having As shown in FIGS. 1a, and 1b, in some exemplary embodiments a grip lock 100 comprises an outer shell 300 formed in a horseshoe or "U" shape and a flexible material 200 affixed to the ends of the outer shell 300. As illustrated, the flexible material is located in a channel 106 formed in the outer shell 300. The flexible material 200 is affixed proximately to the ends of the U-shaped outer shell 300.

Figure 2A:
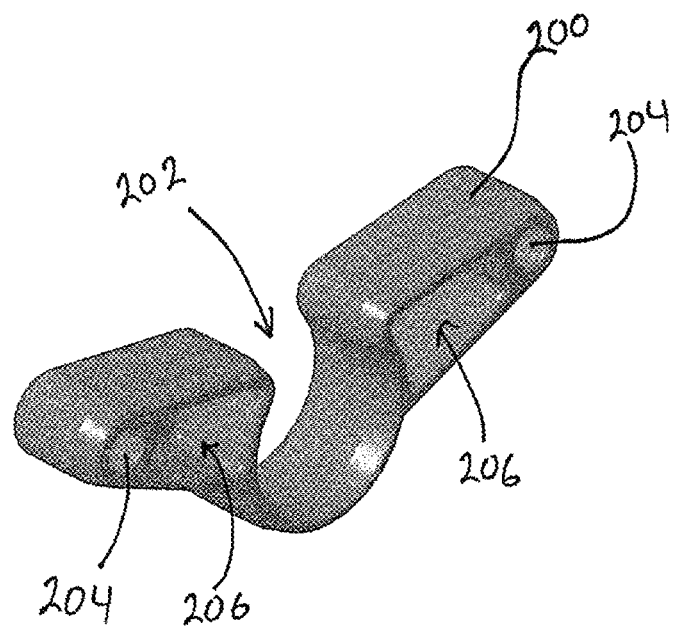
FIGS. 2a-2b illustrate a gripping insert for a grip lock according to exemplary embodiment.
Figure 2B:
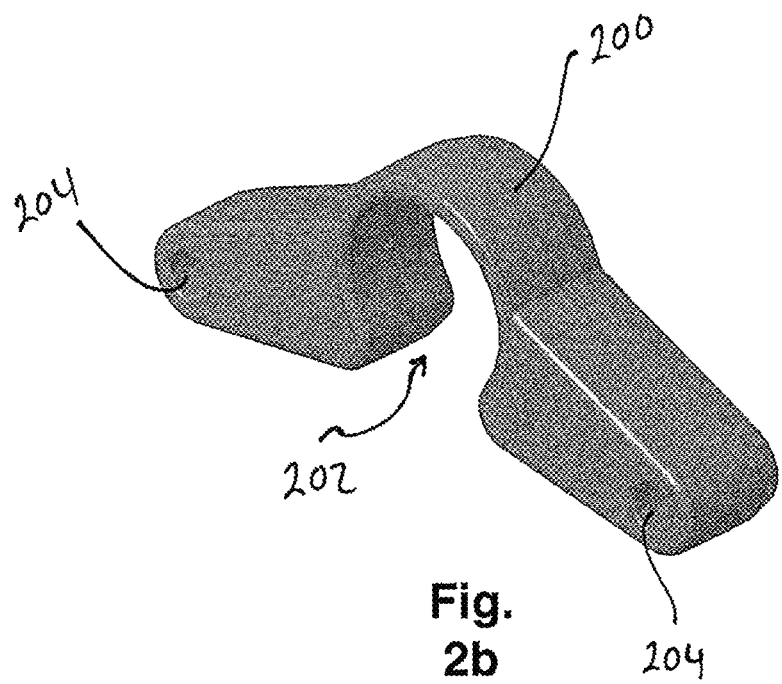

FIGS. 2a and 2b illustrate an exemplary embodiment of the flexible material 200 used in an embodiment of the grip lock 100. In exemplary embodiments, the flexible material 200 portion of the grip lock 100 is molded from TPE (a thermoplastic elastomer), e.g., using cavity molding techniques. As is visible in the exemplary embodiment shown in FIGS. 2a and 2b, the flexible material 200 is formed such that a semi-circular opening 202 is created in the material. Also visible are holes 204 formed near the ends of the flexible material such that it can be affixed to the outer shell. In order to maintain a level of flexibility necessary to grip various sizes of poles and other structures using the grip lock 100, recesses 206 are formed in certain exemplary embodiments to facilitate compression of the flexible material 200 as it is pressed against a pole or other shape.

Figure 1B:
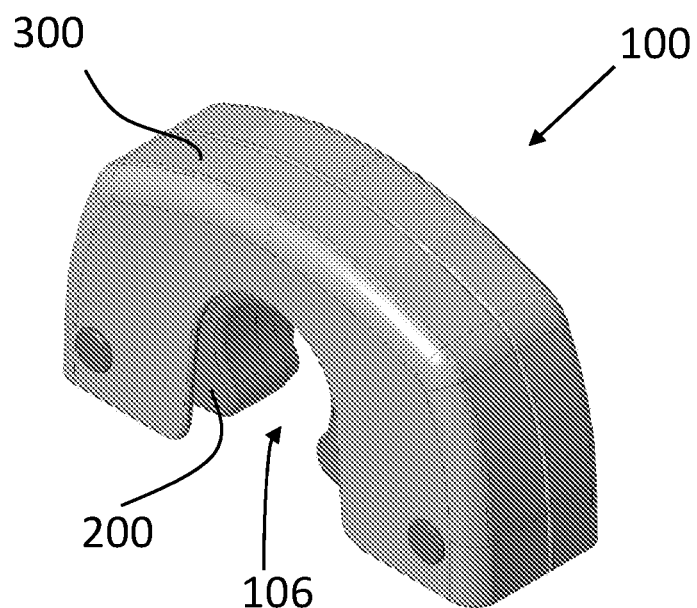
Figure 3A:
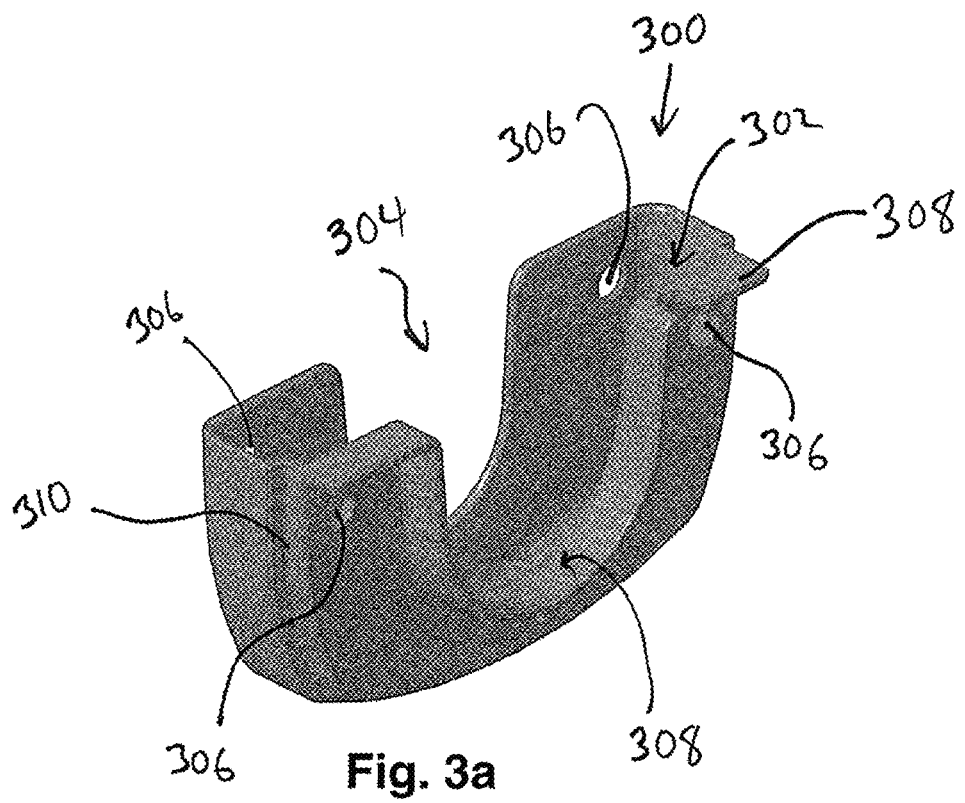
FIGS. 3a-3b illustrate a housing for a grip lock according to exemplary embodiment.
Figure 3B:
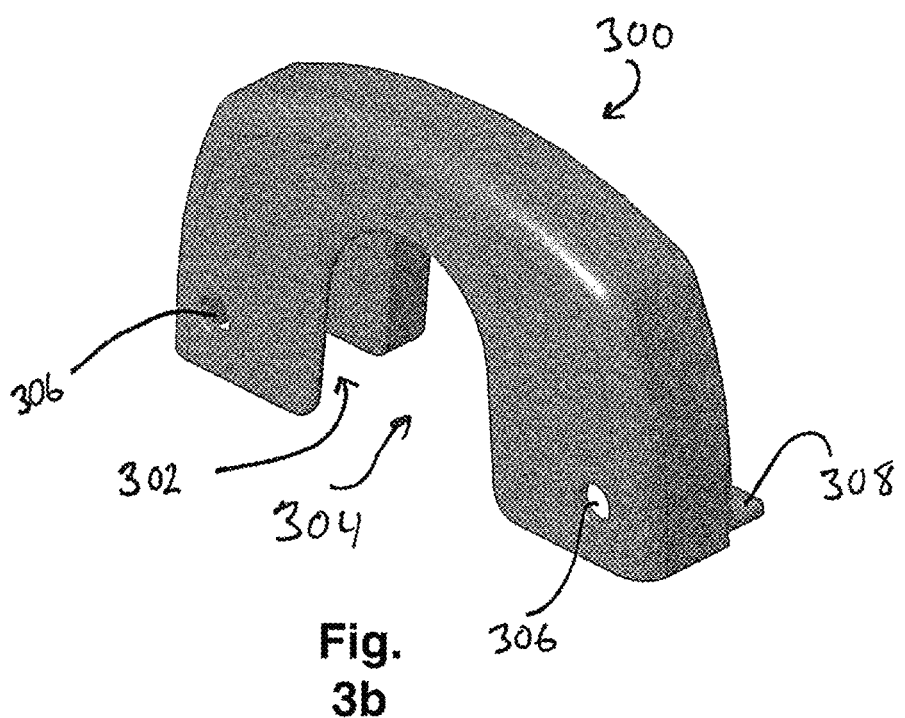
Figure 4A:
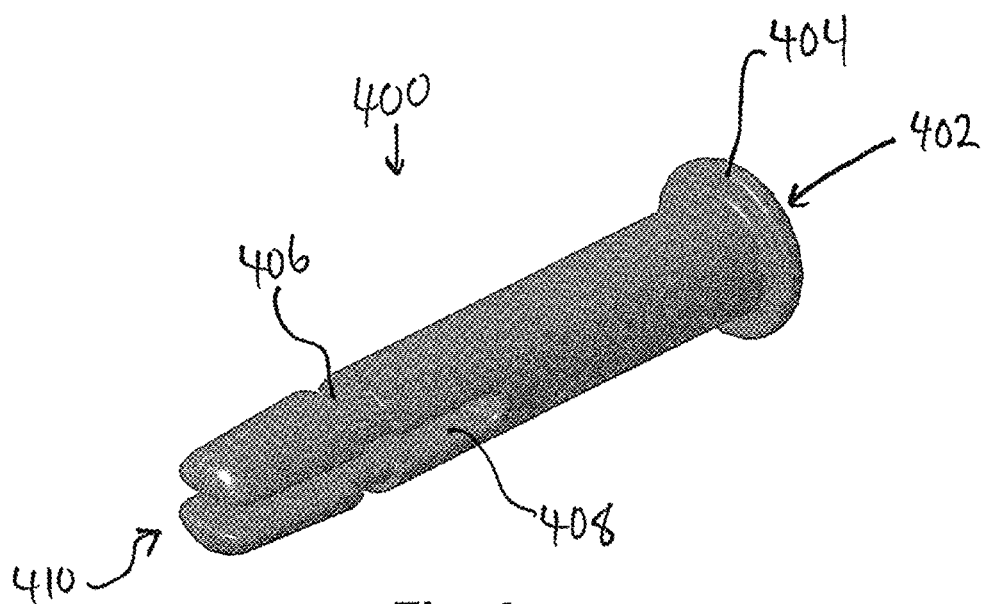
FIGS. 4a-4b illustrate a housing pin for a grip lock according to exemplary embodiment.
Figure 4B:
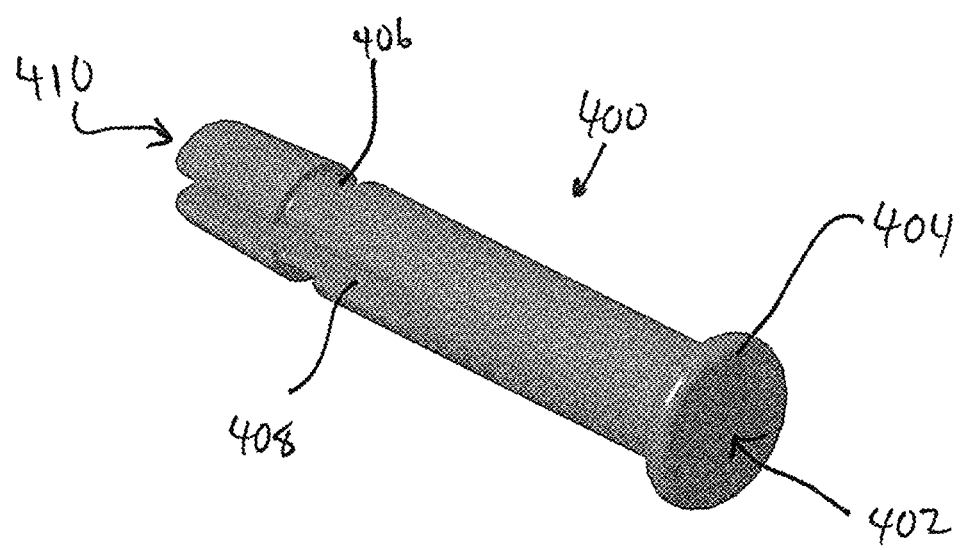

FIGS. 3a-3b illustrate the outer shell 300 of the grip lock 100 from a bottom perspective and a top perspective view. As can be observed in FIG. 3a, a channel 302 is formed in the outer shell 300 according to an exemplary embodiment. This channel 302 receives the flexible material 200 as shown in FIGS. 1a and 1b. The outer shell 300 is formed with holes 306 formed near the ends of the channel 302. As shown, a semi-circular opening 304 is formed in the outer shell 300 to receive a pole to which the clamp is being installed. Because the grip lock 100 is used to support bins, brackets, or other types of organizers or storage, a shelf 308 is formed in one face of the shell 300. In some exemplary embodiments, the outer shell 300 of the grip lock 100 is molded from acrylonitrile butadiene styrene (ABS), e.g., using cavity molding techniques, and plated with a color to match the rest of the caddy, e.g., plated to match the metal finish on a wire shower caddy. In other exemplary embodiments, the outer shell 300 of the grip lock 100 is molded from other materials, e.g., polyethylene terephthalate (PET), PET-G, or polypropylene (PP).

FIGS. 4a-5b show an exemplary embodiment of a pin 400 used to secure the flexible material 200 to the outer shell 300. As shown, at a first end 402 of the pin 400 is an enlarged flange 404 that prevents the pin 400 from passing through the hole 306 formed in the outer shell 300. A capture recess 406 is formed near the second end of the pin. This recess 406 serves to engage the outer shell 300 after the pin 400 is inserted through the outer shell 300 and flexible material 200. A slot 408 is formed in the second end 410 to allow the pin 400 to be compressed and spring back to secure the pin 400 to the outer shell 300.

As illustrated in FIGS. 1a-1b, the grip lock 100 also comprises a secondary component of the outer shell (configured as a cover plate) to secure and hide the hook used to secure the grip lock 100 to a storage organizer or similar structure. As shown in FIG. 3a, the component of the outer shell is formed with a recess 310 adapted to position the cover plate to the outer shell. FIGS. 5a-5b illustrate such a cover plate 500. As shown, the cover plate is formed with a semi-circular opening 502 that corresponds to the opening 304 formed in the outer shell 300. Also illustrated are capture barrels 504 that serve to engage with the ends of the pins 400. This engagement serves to secure the cover plate 500 to the outer shell 300. In some exemplary embodiments, the cover plate 500 may also comprise structures 506 to further secure the outer shell to bins, brackets, or other types of organizers or storage. Visible in FIG. 5a are openings formed to receive the pins that passes through holes 204 in the flexible material 200 of FIGS. 2a-2b to secure the flexible material in place.

Referring to FIG. 6, in order to utilize the grip lock 100 to secure a shower caddy, bins, brackets, or other types of organizers or storage to a pipe or pole in an exemplary embodiment, a hook 602 may be formed in the shower caddy or similar device. The hook 602 is then positioned such that is rests on the shelf 308 formed in the primary component of the outer shell as is shown in FIG. 6. Also visible are the second ends of two pins 400 that secure the flexible material 200 to the outer shell 300. The cover plate 500 is then applied to secure the hook 602 in place. An exemplary embodiment of such a cover plate was illustrated in FIGS. 5a and 5b. FIGS. 7a-7d illustrate the cover plate 500 installed on the outer shell 300, thus affixing the grip lock 100 to a shower caddy/organizer 702 as shown in FIGS. 7c-7d. In exemplary embodiments, the rest of the caddy is formed from soldered or welded wire, bent as shown.

Figure 8:
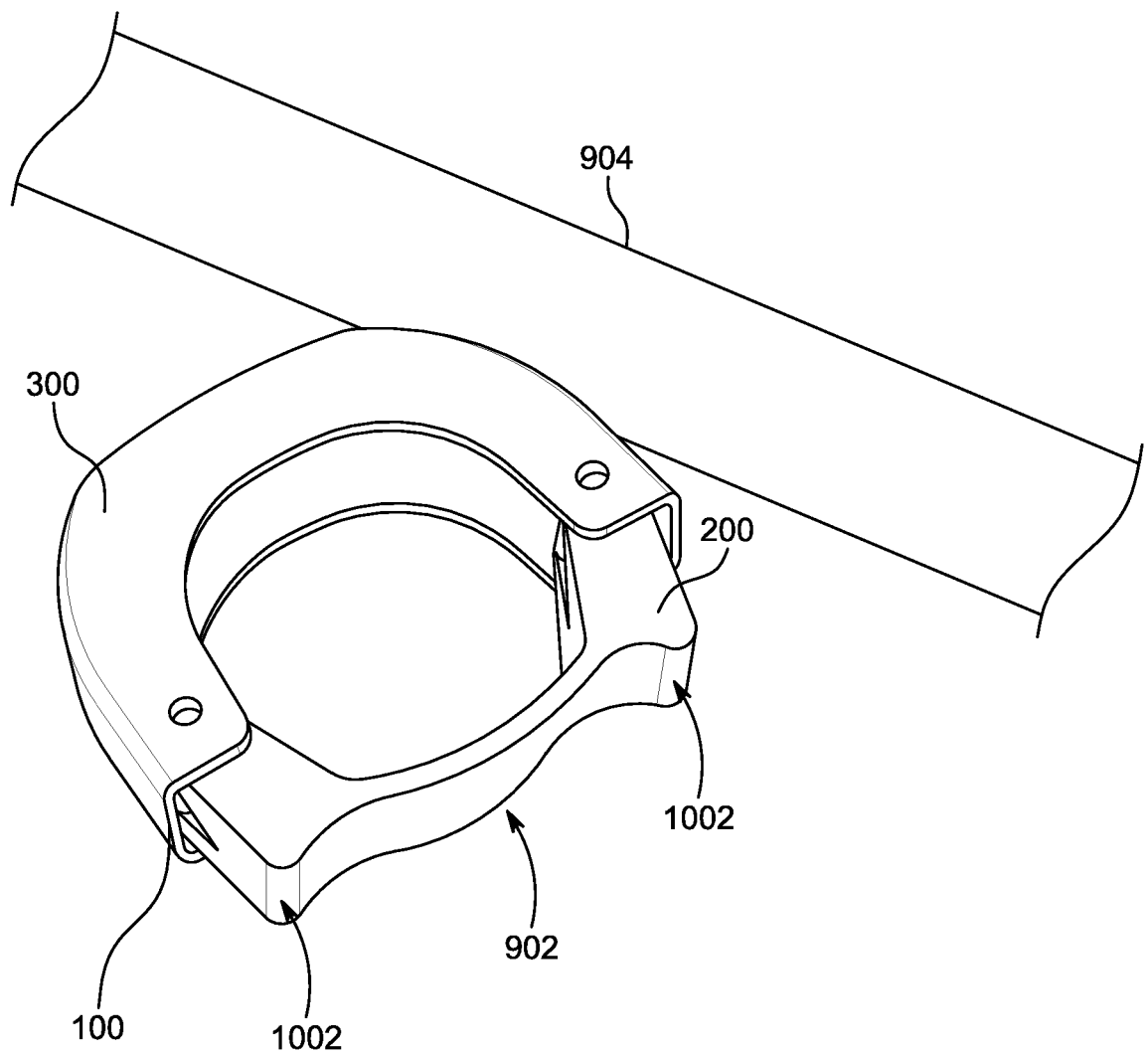
FIGS. 8-12 illustrate the steps of attaching a grip lock according to an exemplary embodiment to a pole or shower pipe.
Figure 9:
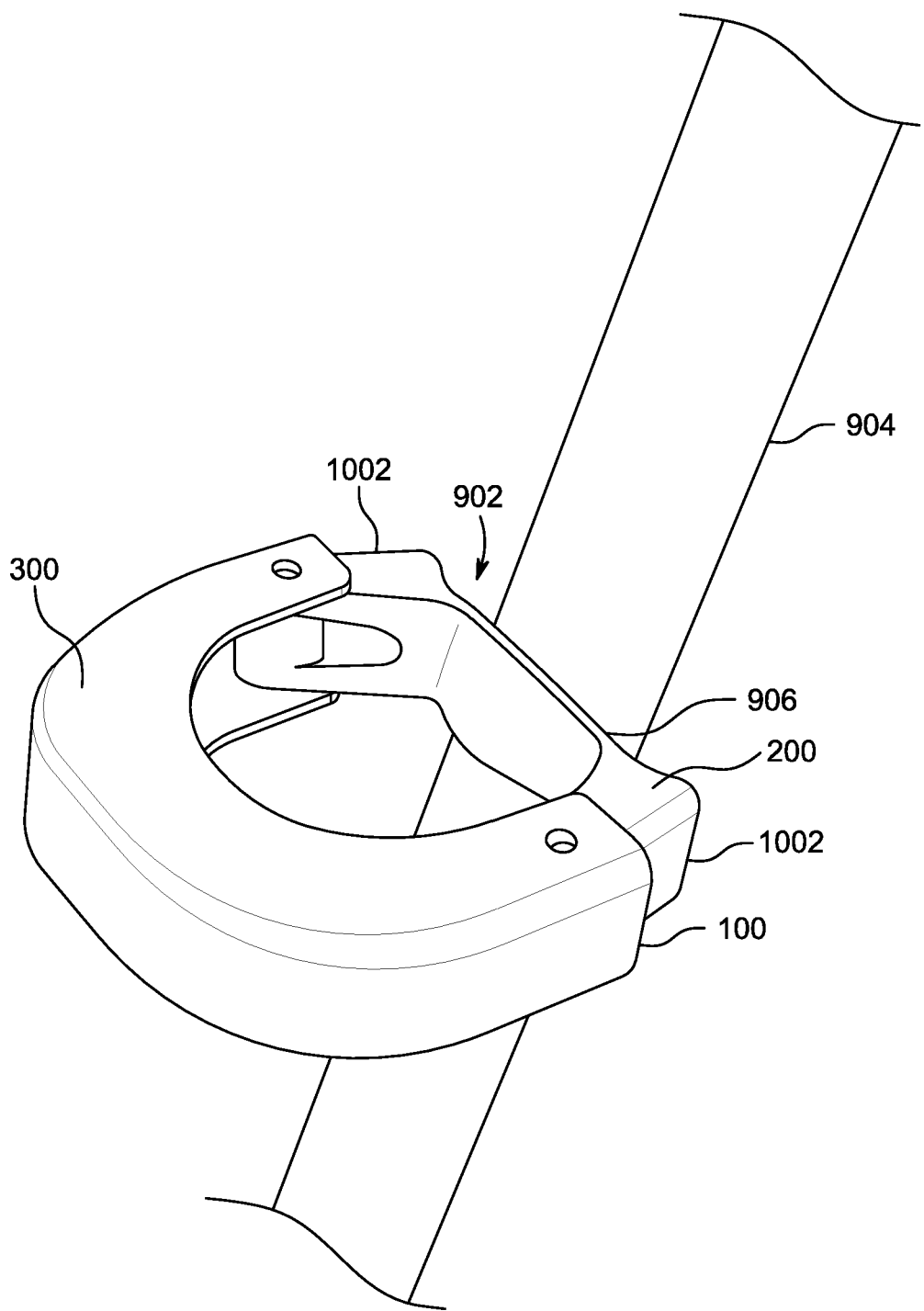
Figure 10:
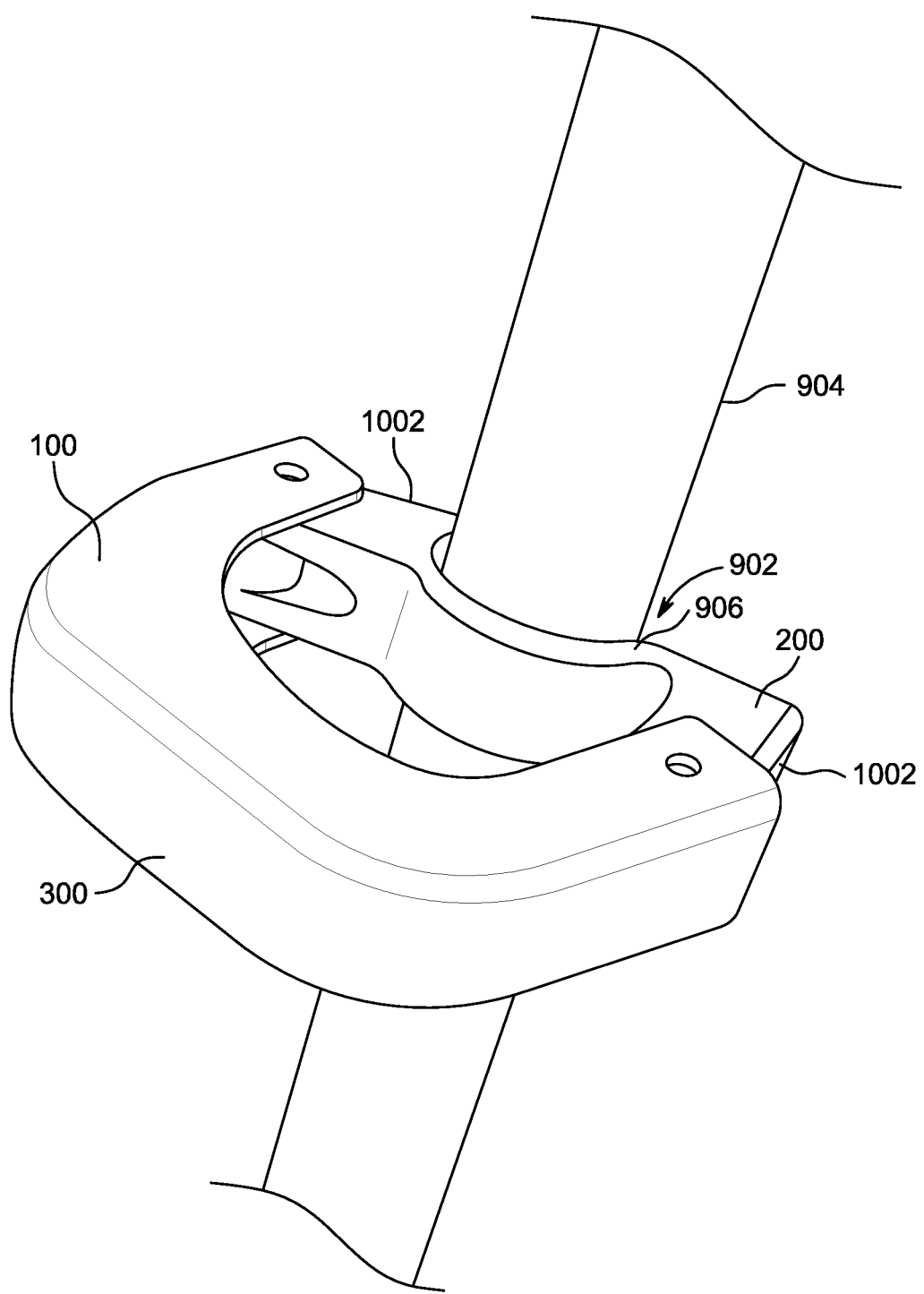

As shown in FIGS. 8-12, to install the exemplary embodiment of a grip lock 100 shown in FIG. 8, an opening 902 of the grip lock 100 is pressed against a shower pipe or pole 904 such that the flexible material 200 affixed to the ends of the outer shell 300 of the grip lock 100 is positioned perpendicularly to the axis of the pipe or pole 904. The flexible material 200 of the grip lock 100 is in a primed position in FIG. 8, i.e., ready to be attached to the vertical pole. As illustrated in FIGS. 9 and 10, when the grip lock 100 makes contact with the pipe or pole 904, the flexible material 200 starts to conform 906 to the curved surface of the pipe or pole 904. As the grip lock 100 is pressed into the pipe or pole 904, the flexible material 200 continues to conform with the shape of the pipe or pole 904, causing enlarged end portions 1002 of the flexible material 200 to be drawn against the pipe or pole 904. As illustrated, the thicker cross-section of the flexible material 200 found at the enlarged end portions 1002 rotates about the pin 400 described in FIGS. 4a-4b. This causes the enlarged end portions 1002 of the flexible material 200 to increase the amount of contact with the shower pipe or pole 904.

This continues until the enlarged end portions 1002 wrap around 1102 the pipe or pole 904 as shown in FIG. 11. FIG. 12 shows the grip lock 100 of FIG. 11 from a rear view. In FIG. 12, the enlarged end portions 1002 have wrapped around more than half of the circumference of the pipe or pole 904. This stretches the flexible material 200, drawing the enlarged end portions 1002 against the pipe or pole 904. This causes the pipe or pole 904 to be drawn into the outer shell 300 of the grip lock 100 where the flexible material 200 grips the pipe or pole 904 and the stretching action of the flexible material 200 causes the pipe or pole 904 to remain in position with regard to the grip lock 100 until the grip lock 100 is removed by reversing the steps illustrated in FIGS. 9-10. Thus, FIGS. 11-12 show the locked position of the grip lock 100.

As mentioned above, virtually any prior art accessory for a vertical pole (e.g., as shown in U.S. Pat. No. 9,693,660) can be modified to take advantage of the teachings herein by replacing the proximal (pole-connecting) portion of the accessory with at least one grip lock 100 affixed to (affixed to or integrally molded therewith) the accessory, subject to the weight holding capabilities of the specific grip lock(s) 100 being used. In exemplary embodiments, two or three or more grip locks 100 are used to secure a single accessory to a support pole, e.g., in some exemplary embodiments, an accessory comprising a basket or larger bin has two or three grip locks 100 aligned vertically to secure the basket or larger bin to a single support pole. The grip lock 100 can be molded integrally with the accessory or connected thereto (e.g., adhered with adhesive, secured with fasteners, ultrasonically welded, etc.), e.g., the outer shell 300 of the grip lock 100 is molded integrally with the accessory or molded separately and connected thereto. For example, the accessories attached to vertical poles shown in U.S. Pat. No. 9,693,660 (e.g., FIGS. 1-2, 16, 18-24B, 31-34G, and 43-72) can all be modified using the teachings herein to use a grip lock 100 for each pole connector (in place of what is shown), e.g., with the outer shell 300 of a grip lock 100 molded integrally with the accessory or molded separately and connected thereto. In some exemplary embodiments, an accessory comprising a basket or bin has two grip locks 100, one at each end, spaced horizontally, to secure the basket or larger bin to a pair of spaced support poles, as shown. Additionally, accessories in copending U.S. patent application Ser. No. 16/988,129, entitled ACCESSORY FLIP LOCK FOR VERTICAL POLE, which is incorporated herein by reference, can all be modified using the teachings herein to use a grip lock 100 for each pole connector (in place of what is shown), e.g., with the outer shell 300 of a grip lock 100 molded integrally with the accessory or molded separately and connected to the accessory. In exemplary embodiments, the accessories are molded from plastic, such as PET, e.g., clear PET, or PP, e.g., white or colored PP, and/or formed from soldered or welded wire, bent as shown.

FIG. 13 illustrates an exemplary pole shelf assembly 1300 which includes a shelf assembly 1302 having (e.g., integrally formed with or affixed to) a grip lock 100. The shelf assembly 1302 is suspended from the grip lock 100 which is removably attached to a pole 1304. The grip lock 100 of exemplary pole shelf assembly 1300 is attached to the vertical pole 1304, e.g., a tension pole (known to those skilled in the art), as shown in FIGS. 9-12 and discussed in corresponding text. A pole receiving receptable 1306 is located at a second location and in an exemplary embodiment, serves to align the shelf assembly to the pole 1304 and increase the weight bearing capacity of the shelf.

FIG. 14 illustrates an exemplary bin assembly 1400 with a bin 1404 having (e.g., integrally formed with or affixed to) a grip lock 100 to secure the bin assembly 1400 to a vertical pole 1402. The bin 1404 may be rectangular, cylindrical, or other shapes and may be made of wire, plastic, or another suitable material. The grip lock 100 is mounted to the pole 1402 such that the bin 1404 is supported by the grip lock 100. The grip lock 100 of exemplary bin assembly 1400 is attached to the vertical pole 1402, e.g., a tension pole (known to those skilled in the art), as shown in FIGS. 9-12 and discussed in corresponding text. In certain exemplary embodiments, the grip lock 100 is integrally formed with or affixed to a hook or hanger from which the bin 1404 hangs (like FIG. 1 of copending U.S. patent application Ser. No. 16/988,129) so that the bin 1404 is suspended from the hook in a manner that the bin 140 can easily be removed for emptying or cleaning. The grip lock 100 of exemplary bin supporting hook is attached to a vertical pole, e.g., a tension pole (known to those skilled in the art), as shown in FIGS. 9-12 and discussed in corresponding text.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. Additionally, the steps of methods herein may generally be performed in any order, unless the context dictates that specific steps be performed in a specific order. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:
1. A method of securing a shower caddy to a shower pipe, comprising:
    providing a shower caddy with a grip hook;

moving a portion of the grip hook into a primed position wherein enlarged end portions of a flexible grip are oriented radially away from an outer shell of the grip hook;

positioning the primed grip hook above the shower pipe;

moving the caddy down to engage the grip hook with the shower pipe to cause the grip hook to move to a locked position wherein the enlarged end portions of the flexible grip are rotated radially inward toward the shower pipe to wrap around the shower pipe, gripping the shower pipe and securing the shower caddy to the shower pipe by the grip hook.

2. The method of claim 1 wherein:

the outer shell comprises an opening sized and configured to receive the shower pipe; and in the locked position, a medial portion of the flexible grip extends into the outer shell opening to secure the shower caddy to the shower pipe within the opening.

3. The method of claim 1, wherein the enlarged end portions of the flexible grip wrap around more than half a circumference of the shower pipe when the shower caddy is secured to the shower pipe.

4. The method of claim 1, further comprising the step of: securing a cover plate to an outer shell of the grip hook.

5. A shower caddy having a grip lock to secure the shower caddy to a shower pipe, comprising:

at least one shelf, basket, tray, hook, mirror, or bin oriented below a hanger, the hanger comprising the grip lock;

the grip lock comprising:

an outer shell having an opening sized and configured to receive the shower pipe; and a flexible grip affixed to the outer shell, the flexible grip having a primed position and a locked position in which the flexible grip secures the shower caddy, wherein, in the primed position, enlarged end portions of the flexible grip are oriented radially away from the outer shell and, in the locked position, the enlarged end portions of the flexible grip are rotated radially inward toward the opening of the outer shell.

6. The shower caddy of claim 5 wherein, in the locked position, a medial portion of the flexible grip extends into the outer shell opening to secure the shower caddy to the shower pipe within the opening.

7. The shower caddy of claim 5, wherein the enlarged end portions are configured to wrap around more than half a circumference of the shower pipe in the locked position.

8. The shower caddy of claim 5, further comprising a cover plate configured to attach to the outer shell of the grip lock.

9. The shower caddy of claim 8, wherein attachment of the cover plate to the outer shell may secure the at least one shelf, basket, tray, hook, mirror, or bin to the grip lock.

10. A shower caddy having a grip lock to secure the shower caddy to a shower pipe, comprising:

at least one shelf, basket, tray, hook, mirror, or bin oriented below a hanger, the hanging comprising the grip lock;

the grip lock comprising;

an outer shell having an opening sized and configured to receive the shower pipe; and a flexible grip affixed to the outer shell, the flexible grip having a first primed position and a second locked position in which the flexible grip secures the shower caddy;

wherein:

the outer shell comprises a rigid outer shell formed in a curved shape, the outer shell having an outer surface and an inner surface, the inner surface extending from a first leg to a second leg of the curved shape;

the outer shell further comprises a recess formed on its inner surface where the recess extends from the first leg to the second leg;

a flexible grip having an enlarged portion at the first end and the second end, the enlarged portion having a greater cross-sectional area than the cross-sectional area along a length of the grip located between the first and second end; and having a larger cross section than the cross section of the recess such that the enlarged portions extend outward from the inner surface of the outer shell into the opening;

the first end of the grip affixed to the first leg, the second end of the grip affixed to the second leg; and the grip held in tension along its length between the first leg and the second leg when installed.

11. The shower caddy according to claim 10, wherein the grip can be moved out to accept a shower pipe and the grip snaps back around the shower pipe to secure the caddy to the shower pipe.

12. The shower caddy according to claim 10, wherein the hanger also comprises a curved portion that is adapted to hang from a shower pipe.

13. The shower caddy according to claim 10, wherein the grip lock forms a portion of the hanger.

14. The shower caddy according to claim 10, wherein the grip comprises a hole formed in each enlarged end portion, the rigid outer shell comprises holes formed in at the first leg and the second leg, and the grip lock further comprising at least two pins configured to be placed into the holes formed in griping material and the holes formed in the first leg and the second leg so as to secure the grip to the rigid outer shell.

15. The shower caddy according to claim 14, wherein each pin comprises a slot formed in an end of the pin.

16. The shower caddy according to claim 10, wherein the grip is formed from TPE.

17. The shower caddy of claim 10, wherein enlarged portions of the flexible grip are configured to wrap around more than half a circumference of the shower pipe in the second locked position.

18. The shower caddy of claim 10, further comprising a cover plate configured to attach to the outer shell of the grip lock.

19. The shower caddy of claim 18, wherein attachment of the cover plate to the outer shell may secure the at least one shelf, basket, tray, hook, mirror, or bin to the grip lock.

* * * * *